United States Patent
Krasnov et al.

(10) Patent No.: US 8,168,322 B2
(45) Date of Patent: May 1, 2012

(54) THIN FILM BATTERY WITH PROTECTIVE PACKAGING

(75) Inventors: Victor Krasnov, Tarzana, CA (US); Kai-Wei Nieh, Monrovia, CA (US)

(73) Assignee: Front Edge Technology, Inc., Baldwin Park, CA (US)

( * ) Notice: Subject to any disclaimer, the term of this patent is extended or adjusted under 35 U.S.C. 154(b) by 11 days.

(21) Appl. No.: 12/783,520

(22) Filed: May 19, 2010

(65) Prior Publication Data
US 2010/0227214 A1    Sep. 9, 2010

Related U.S. Application Data

(63) Continuation of application No. 11/090,408, filed on Mar. 25, 2005, now Pat. No. 7,846,579.

(51) Int. Cl.
*H01M 2/02* (2006.01)

(52) U.S. Cl. ........ 429/175; 429/185; 429/135; 429/162; 429/167; 429/169; 429/186

(58) Field of Classification Search .......... 429/175, 429/135, 148, 162, 169, 177, 186, 246, 247
See application file for complete search history.

(56) References Cited

U.S. PATENT DOCUMENTS

| | | |
|---|---|---|
| 3,375,135 A | 3/1968 | Moulton et al. |
| 3,414,685 A | 12/1968 | Geib et al. |
| 3,530,007 A | 9/1970 | Golubovic |
| 3,844,841 A | 10/1974 | Baker |
| 3,969,142 A | 7/1976 | Greatbatch et al. |
| 3,993,508 A | 11/1976 | Erlichman |
| 4,119,769 A | 10/1978 | Schneider et al. |
| 4,233,371 A | 11/1980 | Dorrestijn |
| 4,309,494 A | 1/1982 | Stockel |
| 4,421,835 A | 12/1983 | Manassen et al. |
| 4,459,328 A | 7/1984 | Mizuhara |
| 4,543,441 A | 9/1985 | Kumada et al. |
| 4,565,753 A | 1/1986 | Goebel et al. |
| 4,597,844 A | 7/1986 | Hiraki et al. |
| 4,619,865 A | 10/1986 | Keem et al. |
| 4,698,256 A | 10/1987 | Giglia et al. |
| 4,714,660 A | 12/1987 | Gates, Jr. |
| 4,725,345 A | 2/1988 | Sakamoto et al. |
| 4,777,090 A | 10/1988 | Ovshinsky et al. |
| 4,871,433 A | 10/1989 | Wagner et al. |

(Continued)

FOREIGN PATENT DOCUMENTS
EP    0829913    3/1998
(Continued)

OTHER PUBLICATIONS

Antaya et al. "Preparation and Characterization of LiCoO2 Thin Films by Laser Ablation Deposition", J. Electrochem. Soc., vol. 140, No. 3, Mar. 1993, pp. 575-578.

(Continued)

*Primary Examiner* — Patrick Ryan
*Assistant Examiner* — Ben Lewis
(74) *Attorney, Agent, or Firm* — Ashok K. Janah; Janah & Associates, P.C.

(57) ABSTRACT

A battery comprises a substrate comprising a first surface comprising a first battery cell having a first non-contact surface, a pliable dielectric abutting the first non-contact surface, the pliable dielectric comprising a peripheral edge, and a first cap about the pliable dielectric.

38 Claims, 7 Drawing Sheets

U.S. PATENT DOCUMENTS

| | | |
|---|---|---|
| 4,873,115 A | 10/1989 | Matsumura et al. |
| 4,877,677 A | 10/1989 | Hirochi et al. |
| 4,904,542 A | 2/1990 | Mroczkowski |
| 4,996,079 A | 2/1991 | Itoh |
| 5,019,467 A | 5/1991 | Fujiwara |
| 5,171,413 A | 12/1992 | Arntz et al. |
| 5,197,889 A | 3/1993 | Rizzo et al. |
| 5,240,794 A | 8/1993 | Thackeray et al. |
| 5,249,554 A | 10/1993 | Tamor et al. |
| 5,262,028 A | 11/1993 | Manley |
| 5,330,853 A | 7/1994 | Hofmann et al. |
| 5,338,625 A | 8/1994 | Bates et al. |
| 5,368,939 A | 11/1994 | Kawamura et al. |
| 5,445,906 A | 8/1995 | Hobson et al. |
| 5,490,911 A | 2/1996 | Makowiecki et al. |
| 5,498,490 A | 3/1996 | Brodd |
| 5,503,912 A | 4/1996 | Setoyama et al. |
| 5,511,587 A | 4/1996 | Miya et al. |
| 5,512,147 A | 4/1996 | Bates et al. |
| 5,512,387 A | 4/1996 | Ovshinsky |
| 5,516,340 A | 5/1996 | Takeuchi et al. |
| 5,547,767 A | 8/1996 | Paidassi et al. |
| 5,552,242 A | 9/1996 | Ovshinsky et al. |
| 5,554,456 A | 9/1996 | Ovshinsky et al. |
| 5,561,004 A | 10/1996 | Bates et al. |
| 5,597,660 A | 1/1997 | Bates et al. |
| 5,607,789 A | 3/1997 | Treger et al. |
| 5,612,152 A | 3/1997 | Bates |
| 5,650,243 A | 7/1997 | Ferment |
| 5,656,364 A | 8/1997 | Rickerby et al. |
| 5,663,183 A | 9/1997 | Frost et al. |
| 5,670,252 A | 9/1997 | Makowiecki et al. |
| 5,670,272 A | 9/1997 | Cheu et al. |
| 5,681,666 A | 10/1997 | Treger et al. |
| 5,700,551 A | 12/1997 | Kukino et al. |
| 5,705,293 A | 1/1998 | Hobson |
| 5,708,297 A | 1/1998 | Clayton |
| 5,725,909 A | 3/1998 | Shaw et al. |
| 5,786,582 A | 7/1998 | Roustaei et al. |
| 5,824,374 A | 10/1998 | Bradley, Jr. et al. |
| 5,871,865 A | 2/1999 | Barker et al. |
| 5,894,656 A | 4/1999 | Menon et al. |
| 5,961,672 A | 10/1999 | Skotheim et al. |
| 5,985,485 A | 11/1999 | Ovshinsky et al. |
| 6,017,654 A | 1/2000 | Kumta et al. |
| 6,022,640 A | 2/2000 | Takada et al. |
| 6,039,850 A | 3/2000 | Schulz |
| 6,051,114 A | 4/2000 | Yao et al. |
| 6,118,248 A | 9/2000 | Gartstein et al. |
| 6,148,503 A | 11/2000 | Delnick et al. |
| 6,168,884 B1 | 1/2001 | Neudecker et al. |
| 6,197,450 B1 | 3/2001 | Nathan et al. |
| 6,217,623 B1 | 4/2001 | Reichert et al. |
| 6,218,049 B1 | 4/2001 | Bates et al. |
| 6,242,129 B1 | 6/2001 | Johnson |
| 6,264,709 B1 | 7/2001 | Yoon et al. |
| 6,280,875 B1 | 8/2001 | Kwak et al. |
| 6,287,711 B1 | 9/2001 | Nieh et al. |
| 6,340,880 B1 | 1/2002 | Higashijima et al. |
| 6,365,010 B1 | 4/2002 | Hollars |
| 6,379,835 B1 | 4/2002 | Kucherovsky et al. |
| 6,387,039 B1 | 5/2002 | Moses |
| 6,387,563 B1 | 5/2002 | Bates |
| 6,398,824 B1 | 6/2002 | Johnson |
| 6,402,796 B1 | 6/2002 | Johnson |
| 6,411,780 B1 | 6/2002 | Maruyama |
| 6,413,645 B1 | 7/2002 | Graff et al. |
| 6,461,757 B1 | 10/2002 | Sasayama et al. |
| 6,517,968 B2 | 2/2003 | Johnson et al. |
| 6,558,836 B1 | 5/2003 | Whitacre et al. |
| 6,632,563 B1 | 10/2003 | Krasnov et al. |
| 6,636,017 B2 | 10/2003 | Zink et al. |
| 6,645,658 B2 | 11/2003 | Morozumi |
| 6,658,124 B1 | 12/2003 | Meadows |
| 6,661,197 B2 | 12/2003 | Zink et al. |
| 6,713,987 B2 | 3/2004 | Krasnov et al. |
| 6,863,699 B1 | 3/2005 | Krasnov et al. |
| 6,866,901 B2 | 3/2005 | Burrows et al. |
| 6,921,464 B2 | 7/2005 | Krasnov et al. |
| 7,056,620 B2 | 6/2006 | Krasnov et al. |
| 7,186,479 B2 | 3/2007 | Krasnov et al. |
| 2001/0007335 A1 | 7/2001 | Tuttle et al. |
| 2001/0041294 A1 | 11/2001 | Chu et al. |
| 2002/0004167 A1 | 1/2002 | Jenson et al. |
| 2002/0028384 A1 | 3/2002 | Krasnov et al. |
| 2002/0071989 A1 | 6/2002 | Verma et al. |
| 2002/0110733 A1 | 8/2002 | Johnson |
| 2002/0156823 A1 | 10/2002 | Weng et al. |
| 2003/0121142 A1 | 7/2003 | Kikuchi et al. |
| 2003/0152823 A1 | 8/2003 | Heller |
| 2003/0160589 A1 | 8/2003 | Krasnov et al. |
| 2004/0018424 A1 | 1/2004 | Zhang et al. |
| 2004/0064937 A1 | 4/2004 | Krasnov et al. |
| 2004/0866762 | 5/2004 | Maeda et al. |
| 2004/0175609 A1* | 9/2004 | Yageta et al. ............ 429/82 |
| 2005/0079418 A1 | 4/2005 | Kelley et al. |
| 2005/0147877 A1 | 7/2005 | Tarnowski et al. |
| 2006/0134522 A1 | 6/2006 | Zhang et al. |
| 2006/0216589 A1 | 9/2006 | Krasnov et al. |
| 2007/0166612 A1 | 7/2007 | Krasnov et al. |
| 2008/0213664 A1 | 9/2008 | Krasnov et al. |
| 2008/0217162 A1 | 9/2008 | Delrue et al. |
| 2008/0263665 A1 | 10/2008 | Li et al. |
| 2009/0010462 A1 | 1/2009 | Ekchian et al. |
| 2009/0057136 A1 | 3/2009 | Wang et al. |
| 2009/0136839 A1 | 5/2009 | Kraznov et al. |
| 2009/0208671 A1 | 8/2009 | Nieh et al. |

FOREIGN PATENT DOCUMENTS

| | | |
|---|---|---|
| EP | 1458037 | 9/2004 |
| FR | 2403652 | 4/1979 |
| GB | 2251119 | 6/1992 |
| JP | 59-032023 | 2/1984 |
| JP | 59-226472 | 12/1984 |
| JP | 60-072168 | 4/1985 |
| JP | 61-195563 | 8/1986 |
| JP | 04-295015 | 10/1992 |
| JP | 09-259929 | 10/1997 |
| JP | 2001-044073 | 2/2001 |
| JP | 2003-249199 | 9/2003 |
| WO | WO95/14311 | 5/1995 |
| WO | WO99/23714 | 5/1999 |
| WO | WO00/60689 | 10/2000 |
| WO | WO01/73873 | 10/2001 |
| WO | WO02/021627 | 1/2003 |
| WO | WO02/042516 | 1/2003 |
| WO | WO03/03149 | 7/2003 |
| WO | WO03/061049 | 7/2003 |
| WO | WO03/073531 | 12/2003 |
| WO | WO03/005477 | 12/2004 |
| WO | WO2006/105188 | 10/2006 |
| WO | WO2006/105050 | 3/2007 |
| WO | WO-2007/042394 | 4/2007 |
| WO | WO2008/108999 | 11/2008 |
| WO | WO2008/134053 | 11/2008 |

OTHER PUBLICATIONS

Fragnaud et al. "Characterization of sprayed and sputter deposited LiCoO2 thin films for rechargeable microbatteries", J. Power Sources, 63 (1996), pp. 187-191.

Birke et al. "Materials for lithium thin-film batteries for application in silicon technology", Solid State Ionics, 93 (1997), pp. 1-15.

Benqlilou-Moudden et al. "Amorphous Lithium Cobalt and Nickel Oxides Thin Films Preparation and Characterization by RBS and PIGE", Thin Solid Films 333 (1998), pp. 16-19.

Jenson, Mark, U.S. Appl. No. 60/191,774, "Comprehensive patent for the fabrication of a high volume, low cost energy products such as solid state lithium ion rechargeable battery, supercapacitors and fuel cells", filed Mar. 24, 2000.

Jenson et al., U.S. Appl. No. 60/225,134, "Apparatus and method for rechargeable batteries and for making and using batteries", Aug. 14, 2000.

Jenson et al., U.S. Appl. No. 60/238,673, "Battery Having Ultrathin Electrolyte", filed Oct. 6, 2000.

PCT International Search Report in Application No. PCT/US2008/013213 (WO 2009/073150 A1), mailed Jun. 18, 2009.

Bates, J.B. et al., "Preffered Orientation of Polycrystalline LiCoO2 Films", Journal of the Electrochemical Society, Issue No. 147 (1).

Roh, N-S, et al., "Effects of Deposition Condition on the Ionic Conductivity", Scripta Materialia, Dec. 17, 1999, pp. 43-49, vol. 42, No. 1, New York, NY.

Bolster, M-E, et al., "Investigation of Lithium Intercalation Metal Oxides", Proceedings of the International Power Source Symposium, Jun. 1980, pp. 136-140 vol. SYMP 34.

Wagner, A.V. et al., "Fabrication and Testing of Thermoelectric Thin Film Devices", 15th International Conference on Thermoelectrics, Mar. 1996, pp. 269-273.

Neudecker et al., "Lithium-Free Thin Film Battery", Journal of the Electrochemical Society, Issue No. 147 (2) pp. 517-523 (2000).

Mattox, Donald, "Handbook of Physical Vapor Deposition (PVD)", Surface Preparation and Contamination Control, 1998, pp. 127-135 and 343-364.

Park, Y.J., et al., "Characterization of Tin Oxide/LiMn2O4 thin-film cell", Journal of Power Sources, Jun. 2000, pp. 250-254, vol. 88, No. 2, Elsevier Science USA.

Office Action dated Mar. 3, 2010 in U.S. Appl. No. 11/946,819, filed Nov. 28, 2007.

Final Office Action dated Sep. 27, 2010 in U.S. Appl. No. 11/946,819, filed Nov. 28, 2007.

Non-Final Office Action in U.S. Appl. No. 12/963,610, dated Oct. 6, 2011, USPTO.

* cited by examiner

THIN FILM BATTERY WITH PROTECTIVE PACKAGING

CROSS REFERENCE

The present application is a continuation of U.S. patent application Ser. No. 11/090,408, filed on Mar. 25, 2005, which is incorporated herein by reference in its entirety.

BACKGROUND

Batteries having thin film components are typically manufactured using processing techniques used to fabricate semiconductors or displays. Their small size allows thin film batteries to be used in many applications, such as for example, portable electronics, medical devices, and space systems. The energy density and specific energy of thin film batteries, which express the energy capacity of the battery per unit volume and weight, respectively, are important performance measures, and consequently, it is desirable to increase the energy density and specific energy of such batteries.

The battery components, such as the anode, cathode and electrolyte, can be sensitive to exposure to the surrounding external environment, for example air, oxygen, carbon monoxide, carbon dioxide, nitrogen, moisture and organic solvents. Thus, protective packaging for the battery cell is provided to reduce or eliminate exposure of the thin films to the external environment. For example, a protective sheet of polymer can be laminated onto the battery structure to serve as protective packaging. However, the resultant laminate structure is often much thicker than the original battery. For example, the laminated sheets typically have to be tens or hundreds of micrometers thick to provide adequate protection and structural support, whereas the battery component themselves are only a few micrometers thick. Thus, the laminated packaging substantially increases the weight and volume of the battery, and consequently, reduces its energy density.

A protective covering film deposited onto the battery structure in the same way as the component films of the battery can also serve as protective packaging. Such protective films can include ceramics, metals and parylene. However, such films often do not provide complete protection for a sufficiently long time and can allow gases or other atmospheric elements to leach through the films in a relatively short time of only a few months. These covering films also do not provide adequate structural support, and their use may entail additional packaging to increase the structural strength of the battery, and thus further reduce its energy density. Furthermore, these films have to also be several tens of micrometers thick to provide adequate environmental protection, and this additional thickness further reduces energy density.

A sheet of glass can also be positioned over the battery component films to serve as protective packaging. However, the glass sheet presents an inflexible boundary to the underlying battery component films. For example, the anode typically expands and contracts during the charge and discharge cycles of the battery. The inflexible glass sheet restricts such expansion creating mechanical stresses in the anode which may eventually lead to mechanical or chemical failure and reduce the lifetime or degrade the performance of the battery. The glass sheet is also typically too thick and weighty, thus further reducing the energy density and specific energy of the battery.

Thus, there is a need for a battery that protects against the environmental elements for the battery component films. There is also a need for a battery having relatively high energy density and specific energy. There is further a need for a battery that provides protection to the comprising components for long periods of time. There is also a need for a battery having adequate structural support.

SUMMARY

A battery comprises a substrate comprising a first surface comprising a first battery cell having a first non-contact surface, a pliable dielectric abutting the first non-contact surface, the pliable dielectric comprising a peripheral edge, and a first cap about the pliable dielectric.

In another version, a battery comprises a substrate comprising a first surface comprising a first battery cell having a first non-contact surface, and a second surface having a second battery cell with a second non-contact surface. A pliable dielectric abuts the first and second non-contact surfaces, the pliable dielectric comprising a peripheral edge. First and second caps are provided about the pliable dielectric.

In a further version, a battery comprises a first substrate comprising opposing surfaces, at least one of the opposing surfaces comprising a battery cell having a non-contact surface abutting a first pliable dielectric, and a pair of first caps about the first pliable dielectric. A second substrate comprising opposing surfaces, at least one of the opposing surfaces comprising a battery cell having a non-contact surface abutting a second pliable dielectric, and a pair of second caps about the second pliable dielectric. A seal extends around the side faces of a gap between a first cap and a second cap.

DRAWINGS

These features, aspects and advantages of the present invention will become better understood with regard to the following description, appended claims, and accompanying drawings, which illustrate examples of the invention. However, it is to be understood that each of the features can be used in the invention in general, not merely in the context of the particular drawings, and the invention includes any combination of these features, where:

DESCRIPTION

Figure 1:
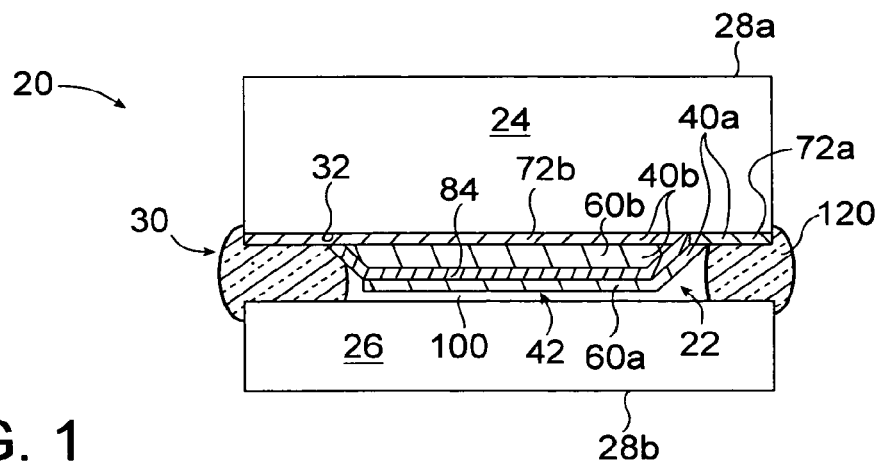
FIG. 1 is a sectional view of a battery comprising a single battery cell on a substrate with a gap between the battery cell and a facing cap.

An embodiment of a battery 20 having features of the present invention is illustrated in FIG. 1. The battery 20 is useful in many applications requiring small size, high specific energy and energy density, and resistance to environmental elements. In the version shown, the battery 20 comprises a single battery cell 22 enclosed on one side by the substrate 24 and on the other side by a cap 26 facing the substrate 24. The enclosure formed by the substrate 24 and cap 26 protect the thin films of the battery cell from the external environment. The substrate 24 is made from a material that is suitably impermeable to environmental elements, has a relatively smooth surface 32 upon which to form thin films, and also has sufficient mechanical strength to support the deposited thin films at fabrication temperatures and at battery operational temperatures. The substrates 24 may be an insulator, semiconductor, or a conductor, depending upon the desired electrical properties of the exterior substrate surface 28a. For example, the substrate 24 can also be made from aluminum oxide or glass, or even aluminum or steel, depending on the application.

In one version, the substrate 24 comprises mica, which is a layered silicate typically having a muscovite structure, and a stoichiometry of $KAl_3Si_3O_{10}(OH)_2$. Mica has a six-sided planar monoclinical crystalline structure with good cleavage properties along the direction of the large planar surfaces. Because of this crystal structure, mica may be split into thin foils along its cleavage direction to provide thin substrates 24 having surfaces which are smoother than most chemically or mechanically polished surfaces. Chemically, mica is stable and inert to the action of most acids, water, alkalies, and common solvents, making it a good surface covering for the battery. Electrically, mica has good dielectric strength, a uniform dielectric constant, and low electrical power loss factor. Mica is also stable at high temperatures of up to 600° C. and has good tensile strength. A mica substrate 24 having a thickness of less than about 100 μm, and more typically from about 4 μm to about 25 μm, is sufficiently strong to provide a good mechanical support for the battery 20. This substrate thickness also provides a good barrier to external gases and liquids in the direction normal to the cleavage plane of the planar strata, and thus, is capable of providing good environmental protection in many different environments. Mica also has a relatively low weight and volume, thus improving the specific energy and energy density of the battery.

At the other side of the battery cell 22, facing the substrate 24 is a cap 26 that serves as a portion of the battery enclosure. The cap is 26 is typically made from a material that is resistant to environmental degradation and provides an impenetrable seal from external gases and liquids. The cap 26 can also comprise the same material as the substrate 20, such as a sheet of mica, in which case both wide area sides of the battery are enclosed by mica sheets. The substrate 24 or cap 26 can also be made from other materials, including quartz, metal foil, metalized plastic film, metal casing, ceramic casing or glass casing. In one example, the entire enclosure is made from a cap 26 comprising a metal foil that is joined together at its edges by solder or glue, as for example, shown in FIG. 7. The substrate 24 and cap 26 can also be made from different materials, for example, a substrate 24 of mica and a cap 26 of metal foil.

The substrate 24 and facing cap 26 form a large percentage of the external enclosing surface area of the battery 20 that protects the internal battery structure from exposure and corrosion by the surrounding environment. For example, in one type of battery, the external surface 28a of the substrate 24 itself forms approximately 45% of the total external area of the battery 20, and another 45% of the total external area is formed by external surface 28b of the cap 26. The remaining 10% or less of external area of the battery 20 occurs along a plurality of side faces 30 that are the spaces between the cap 26 and substrate 24. Preferably, the battery 20 is fabricated so that at least one substrate 24 on which a battery cell 22 is formed, serves to also form a large percentage of the area of the battery 20 that is exposed to the surrounding environment. Thus, in the battery shown in FIG. 1, about 45% of the external surface area of the battery 20 is formed by the backside surface 28a of the substrate 20, and the surface 28a of the cap 26 forms about another 45%, with the remaining 10% is formed by the side faces 30. In the alternative, when the substrate 24 and cap 26 are made from the same material, for example, two sheets of mica—about 90% of the external surface area of the battery 20 arises from the surfaces 28a,b. By using the substrate 24 itself, to serve as the supportive structure for the battery 20 as well as the enclosing environment, the weight and volume of the enclosing structure is minimized, thereby increasing the energy density of the battery.

Each battery cell 22 of the battery 20 comprises a plurality of conductors 40a,b that are on opposing surfaces of an electrolyte 84. The conductors 40a,b are made from conducting metals and can serve as electrodes 60a,b, current collectors 72, adhesion film, or combinations thereof. For example, the first pair of conductors 40a can include an anode electrode 60a, and optionally, can also include an anode current collector 72a. In some versions, an anode current collector is not used because the anode serves both as the anode current collector and the anode itself. The second pair of conductors 40b can include a cathode electrode 60b and an optional cathode current collector 72b. The position and order of the conductors 40a,b may be interchanged, for example, the position of the anode 60a and anode current collector 72a may be interchanged with the position of the cathode 60b and cathode current collector 72b. Thus, the claims should not be limited to the illustrative version shown in the drawings. In the version shown in FIG. 1, when used, the anode current collector 72a and the cathode current collector 72b are both formed on the surface of the substrate 24 and the other layers are deposited over these layers.

The electrodes, namely the anode 60a and cathode 60b, each comprise an electrochemically active material, such as, for example, amorphous vanadium pentoxide $V_2O_5$, or one of several crystalline compounds such as $TiS_2$, $LiMnO_2$, $LiMn_2O_2$, $LiMn_2O_4$, $LiCoO_2$ and $LiNiO_2$. The electrodes typically have a thickness that is sufficiently thick to provide good current carrying capacity and sufficiently thin to minimize expansion stresses and electrical resistance for the passage of both ions and electrons. A suitable thickness for the electrodes is from about 0.1 μm to about 20 μm. In one version, electrodes 60a,b are made from a lithium film which is sufficiently conductive to also serve as the current collector 72a,b, and in this version the electrodes 60a,b and the current collector 72a,b are the same. In yet another version, one or more of the electrodes 60a,b may be made from metals, such as copper.

The current collectors 72a,b provides a conducting surface from which electrons may be dissipated or collected from the electrode 60a,b. The current collectors 72a,b are thus shaped and sized to increase electron conductivity to or from the electrodes 60a,b and are formed over or below the electrodes to electrically couple to them. The current collectors 72a,b are typically conductive layers comprising metal-containing materials, such as for example, metal, non-reactive metal, metal alloy, metal silicide, or mixtures thereof. For example, in one version, each current collector 72a,b comprises a non-reactive metal such as silver, gold, platinum or aluminum. The advantage to using a non-reactive metal is that the battery 20 may be processed at relatively high temperatures after forming the current collectors 72a,b without the current collector material reacting with other component films of the battery 20. However, in other versions, the current collectors 72a,b need not be a non-reactive metal. The current collectors 72a,b have a thickness selected to provide a suitable electrical conductivity, for example, in one version, the current collectors 72a,b have thicknesses of from about 0.05 μm to about 5 μm.

The battery 20 may also comprise one or more adhesion layers (not shown) deposited on the substrate 24 or other layers to improve adhesion of overlying layers. The adhesion layer can comprise a metal such as, for example, titanium, cobalt, aluminum, other metals; or a ceramic material such as, for example, $LiCoO_x$, which may comprise a stoichiometry of $LiCoO_2$. In one version, the adhesion layer is deposited on the substrate 24 and comprise the same material as the current collectors 72a,b.

The battery 20 also comprises an electrolyte 84 between the pair of conductors 40a,b such as the anode 60a and the cathode 60b. The electrolyte 84 may be, for example, an amorphous lithium phosphorus oxynitride film, also known as a LiPON film. In one embodiment, the LiPON is of the form $Li_xPO_yN_z$ in an x:y:z ratio of about 2.9:3.3:0.46. In one version, the electrolyte 84 has a thickness of from about 0.1 μm to about 5 μm. This thickness is suitably large to provide sufficiently high ionic conductivity and suitably small to reduce ionic pathways to minimize electrical resistance and reduce stress.

The battery 20 has a single separation gap 100 between a non-contact surface 42 of a conductor 40a, such as a surface of an electrode 60a, formed on the substrate 24 and the cap 26. The separation gap 100 can either be a space between the conductor 40a and the cap 26. The separation gap 100 provides room for the components of the battery cell 22 to expand and move during operation of the battery 20. For example, the battery cell 22 may generate or receive heat during operation which may cause the conductors 40a,b, for example, the electrodes 60a,b, optional current collectors 72a,b or other components of the battery cell 22, to undergo thermal expansion. The electrodes 60a,b or the electrolyte 84, or both, may also experience expansion or contraction of their volume due to the removal or addition of material to these layers through electrochemical processes occurring during operation of the battery 20. Without the separation gap 100, components of the battery 20 would have no room to expand and may experience undesirable mechanical stresses, which could lead to reduced performance or failure of the battery 20. For example, undesirable mechanical stresses may result in a physical failure, such as a breakage or delamination, of a comprising battery cell film. This may cause a discontinuity in an electrical path of the battery 20 or a parasitic electrical resistance that may reduce performance of the battery 20, such as reducing the output voltage, power storage capacity, or charging time.

The separation gap 100 has a gap distance $d_g$ that is selected to be sufficiently large to provide room for expansion of battery components. The gap distance $d_g$ is selected to be sufficiently small to avoid excessively impacting the energy density of the battery 20. For example, in one version, the gap distance $d_g$ is selected to be from about 1 μm to about 120 μm. In another version, the gap distance $d_g$ is selected to be less than about 10 μm. The gap 100 is bounded by the non-contact surface 42, which is on at least one of the conductors 40a, 40b and the side faces 30 which are the originally open side facing regions around the perimeter edge of the gap 100 not enclosed by the substrate 24 or cap 26. The total area of the side faces 30 is maintained small by maintaining a small gap distance $d_g$ to reduce the diffusion or passage of gas species that enter the battery 20 from the side faces 30 and travel to the conductor 40 or other films of the battery and cause corrosion or other degradation of the thin films. Thus, preferably, the ratio of the area of the non-contact surface 42 of the conductor 40a to the total area of the side faces 30 is at least about 10:1 and more preferably, from about 20:1 to about 50:1. The total area of the side faces 30 is the cumulative area of the side faces 30. The separation gap 100 presents a location where the components of the battery cell 22 might be exposed to undesirable atmospheric elements if otherwise unprotected. A narrow gap 100 defines a narrow passage that limits migration of gas or other contaminant species from the external environment to the conductors 40a,b.

To further reduce or entirely prevent migration of gas species from the side faces 30 to the conductors 40 and other thin films, a seal 120 extends around the side faces 30 of the gap 100. The seal 120, in conjunction with the substrates 24, provides a hermetic boundary between the battery components and environmental elements. For example, the seal 120 is environmentally stable and provides a barrier against moisture. Preferably, the seal 120 comprises a moisture permeability of less than about 10 g·mil/(in$^2$·day) or even less than about 1.75 g·mil/(100 in$^2$·day). The seal 120 can also be pliant to allow lateral expansion of the conductor 40 by being made form a pliable dielectric or conducting material. For example, the seal 120 can be made from epoxy, polymerized ethylene acid copolymer, Apiezon® (M&I Materials LTC, U.K.), paraffin, wax, Surlyn® (Dupont de Nemours), or mixtures thereof. The seal 120 may also comprise a conductive material such as metal or ceramic powder filled epoxy and low melting point metal such as indium, tin, lead, or mixtures thereof. When conductive materials are used as seals, they need to be insulated from the current collector 72.

Figure 2:
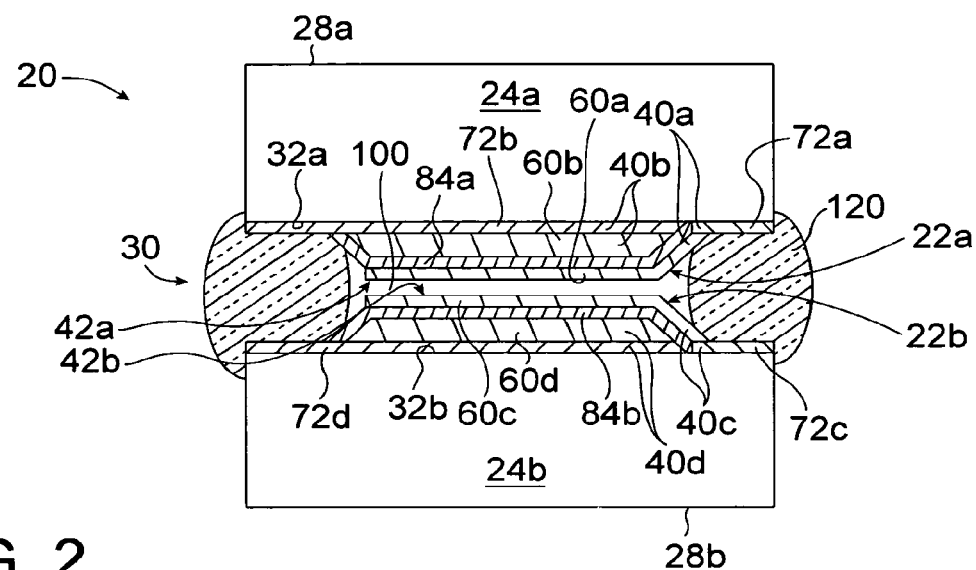
FIG. 2 is a sectional view of a battery comprising two facing battery cells with a gap therebetween and enclosed by caps which are the substrates themselves.

In the version illustrated in FIG. 2, the battery 20 comprises two battery cells 22a,b that face one another with a separation gap 100 therebetween. The first battery cell 22a comprises a first pair of conductors 40a, 40b on a substrate 24; and the second battery cell 22b comprises a second pair of conductors 40c, 40d on a second substrate 24b. In this version, each conductor 40 comprises an electrode 60 and a current collector 72. For example, in cell 22a, the pair of conductors 40a, 40b comprises an anode 60a and cathode 60b, respectively, and also includes two current collectors comprising an anode current collector 72a and a cathode current collector 72b, respectively. Similarly, in cell 22b, the pair of conductors 40c, 40d comprises an anode 60c and cathode 60d, respectively, and also includes two current collectors comprising an anode current collector 72c and a cathode current collector 72d, respectively. The position and order of the conductors 40 may be interchanged, for example, the position of the anodes 60a,c and anode current collectors 72a,c may be interchanged with the position of the cathode 60b,d and cathode current collector 72b,d. In the version shown in FIG. 2, both current collectors 72a, 72b are formed on the substrate 24a. The separation gap 100 between the battery cells 22a,b also prevents cross-talk between electrically independent conductors, such as the electrodes 60a,d from opposing battery cells 22a,b which face each other across the gap 100.

Figure 3:
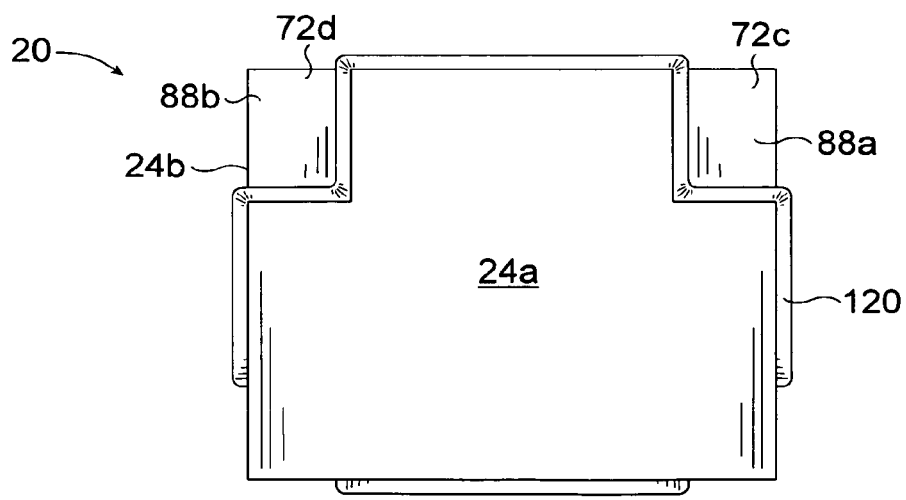
FIG. 3 is a top view of the battery of FIG. 2.

The battery 20 comprises a set of battery terminals 88a,b to the exterior surface of the battery 20, as shown in FIG. 3. The terminals 88 comprise a negative terminal 88a and a positive terminal 88b. The battery 20 can also comprise multiple sets of terminals that include a first set of positive and negative terminals, and a second set of positive and negative terminals. The terminals 88a,b can be exposed portions of the current collectors 72c,d, respectively, as for example, shown in FIG. 3, where a portion of each current collector 72c,d extends out from the interior of the battery 20 to present a surface to the exterior environment that acts as the terminals 88a,b. Each terminal 88a,b that is an exposed surface of a current collector 72c,d is an electrical thin film conductor substantially free of defects, and can be made of the same material as the current collectors 72. In another version, the terminal 88 is a metal foil or wire that is attached to the current collector 72.

In the version of FIG. 2, the battery 20 comprises a single separation gap 100 between the non-contact surfaces 42a,b of the first pair of conductors 40a, 40b and a non-contact surface 116b of the second pair of conductors 40c, 40d, with at least one of the first pair of conductors 40a, 40b spaced apart from at least one of the second pair of conductors 40c, 40d by the gap distance $d_g$. In this version, the battery 20 comprises two complete battery cells 22a,b, each battery cell 22a,b producing a battery cell voltage across an independent set of terminals 88a,b. The two battery cells 22a,b can be electrically independent with separate terminals 88 (not shown) or can be connected in series or in parallel. In this version, the separation gap 100 is between a conductor 40 and the second substrate 24b, which serves as a cap 26. The cap 26 can also be a material that is impermeable to aforementioned environmental elements, such as for example, glass. The separation gap 100 can either be a space between the conductor 40 and the cap 26 or the gap 100 can be filled with a pliable material as described below. The gap 100 can also have electrical connectors that extend thorough the gap 100 to connect one or more of the conductors 40 on the substrate 24 to the external environment, as described below.

Figure 4:
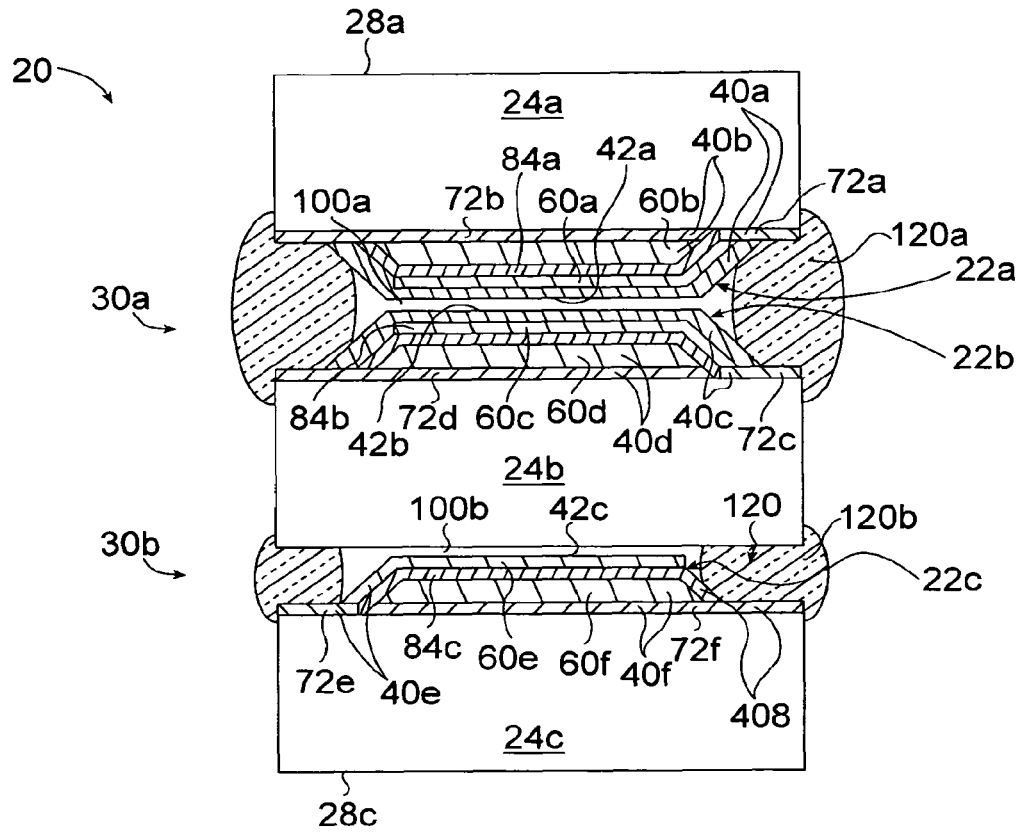
FIG. 4 is a sectional view of a battery comprising two facing battery cell on adjacent and separate substrates and a third battery cell on a substrate which also serves as a cap.

In yet another version, the battery 20 comprises a plurality of battery cells 22 with a plurality of separation gaps 100 between the cells. For example, in one version, such as the version shown in FIG. 4, the battery 20 comprises three battery cells 22a-c with two separation gaps 100a,b having gap distances $d_g$ and $d_{g2}$. In this version, the battery 20 comprises three battery cells 22a-c, each cell 22 electrically independent from the others and presenting an independent pair of terminals (not shown) to the exterior of the battery. The first separation gap 100a having a gap distance $d_g$ is located between a non-contact surface 42a of one of the first pair of conductors 40a, 40b and a non-contact surface 42b of one of the second pair of conductors 40c, 40d. The second separation gap 100b having a gap distance $d_{g2}$ is located between the second substrate 24b and one of a third pair of conductors 40e, 40f formed on a third substrate 24c. Each substrate 24a-c has only one surface with the battery cells 22a-c on it. In this battery 20, the battery cells 22a-c are connected such that the substrates 24a-c themselves form the battery caps, thereby efficiently using the battery cell components to provide a battery with a higher specific energy.

Figure 5:
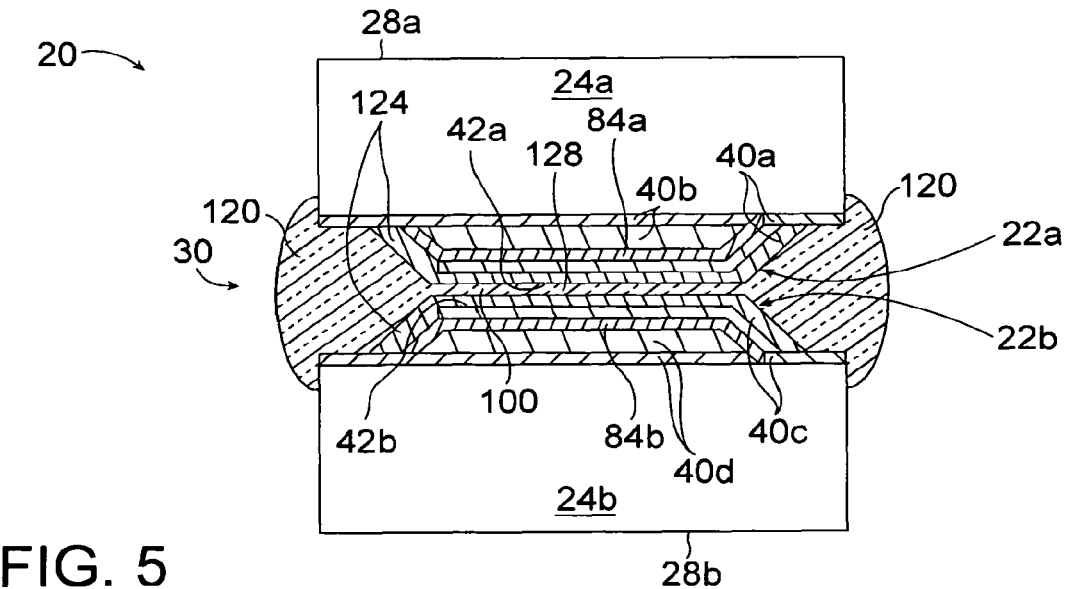
FIG. 5 is a sectional view a battery having facing batteries with a pliable dielectric therebetween and caps formed by the substrates themselves.

In the version of FIG. 5, the separation gap 100 is formed between the non-contact surface 42a,b of two facing battery cells 22a,b and is filled by a pliable dielectric 128. The pliable dielectric 128 has enough flexibility to allow expansion of film components of the facing batteries 22a,b into the filled gap 100. The pliable dielectric 128 also electrically insulates the component films of the batteries 22a,b and allows the conductors 40a-d about the electrolytes 84a,b to change volume during charge and discharge cycles. Thus, the pliable dielectric 128 comprises a material that does not react with the conductors 40a-d and can withstand pressures applied to the battery during conventional use, without excessive deformation. For example, preferably, the pliable dielectric 128 is capable of withstanding a pressure of up to about 1 kg/mm$^2$ with a thickness deformation of less than about 0.1 mm. The pliable dielectric 128 should also be flexible under an applied pressure. In terms of insulative properties, the pliable dielectric 128 can have a resistivity greater than $10^4$ Ωcm. The presence of the pliable dielectric 128 may reduce the minimum gap distance required to prevent electrical communication between conductors 40 in separate battery cells 22. Preferably, the pliable dielectric 128 comprises a moisture permeability of less than about 10 g·mil/(100 in$^2$·day). The pliable dielectric 128 may comprise grease (Apiezon®) wax, paraffin, mineral oil or any material that does not react with the conductor, or mixtures thereof. The advantage of using grease is its lower viscosity results in a smaller gap. The pliable dielectric 128 may also comprise other materials. Generally, the pliable dielectric 128 should have a thickness sufficiently thick to prevent generated electrical currents from passing therethrough and sufficiently thin to block diffusion of external gases from the peripheral edge of the pliable dielectric to the thin films of the batteries 22 within the battery 20. A suitable thickness of the pliable dielectric 128 is from about 1 μm to about 20 μm. The pliable dielectric 128 may be both the dielectric in the separation gap 100 and the seal 120 about the perimeter 30 of the separation gap 100.

The battery 20 may also comprise a protective layer 124 about some of the components of the battery 20, as shown in FIG. 5. For example, the protective layer 124 can be positioned between the conductors 40 and the separation gap 100 or between the conductors 40 and the substrate 24. The protective layer is also pliant and allows the electrodes 60 to change volume during charge/discharge. The protective layer 124 provides further protection to the battery cell component films from atmospheric elements, such as, for example, during manufacture of the battery 20. The protective layer 124 also presents a hermetic boundary between the protected components and the environmental elements. The protective layer 124 may need to protect for a relatively short period of time, for example, only during certain steps of the manufacturing process. Thus, the comprising material of the protective layer 124 need not necessary provides the same degree of protection as the seal 120 and the substrates 24. The protective layer 124 may comprise parylene, dielectric material, or mixtures thereof. The protective layer 124 may also comprise other materials. However, the protective layer 124 does not need to be included only in this particular embodiment, and can be found in any embodiment of the battery 20.

Figure 6:
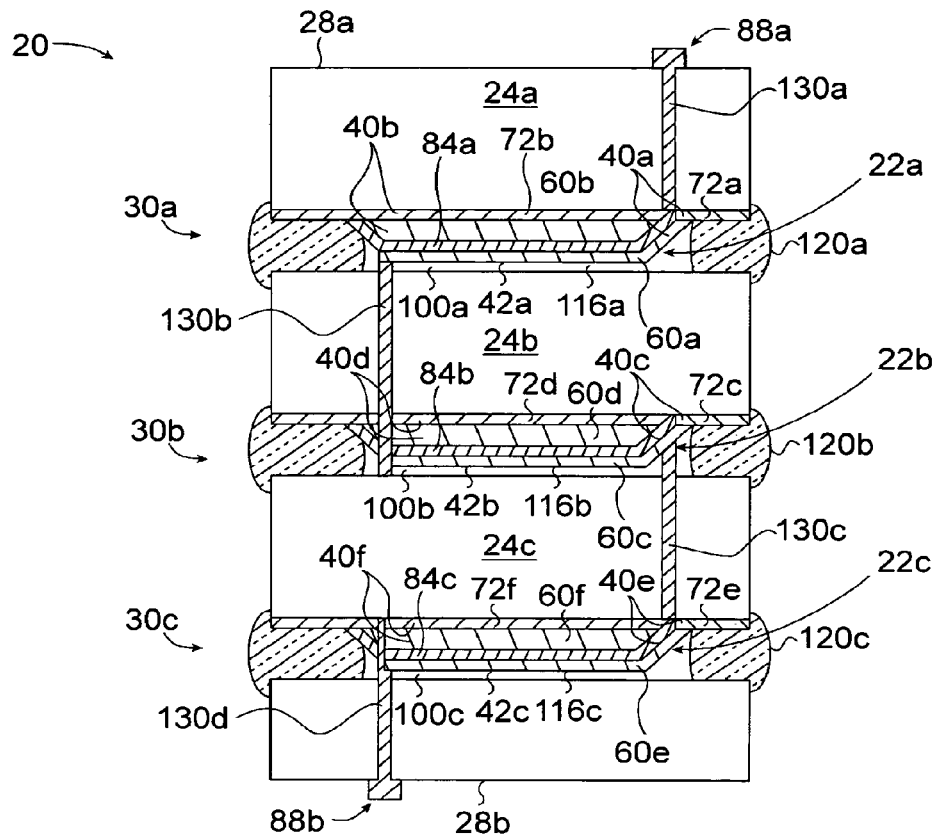
FIG. 6 is a schematic sectional view of a battery comprising a stack of battery cells connected in series.
Figure 7:
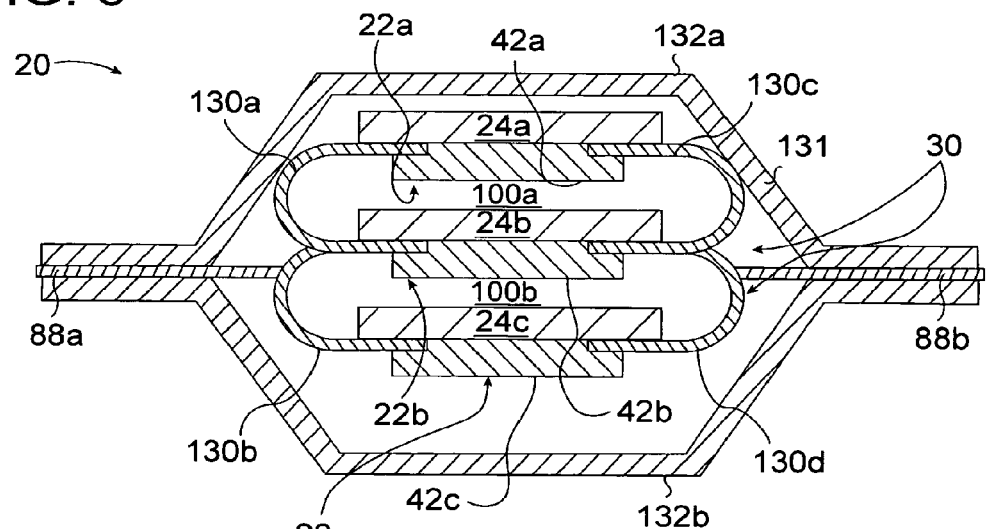
FIG. 7 is a schematic sectional view of a battery comprising a stack of batteries connected in parallel.

Still further versions of the battery 20 comprising a plurality of interconnected battery cells 22a-c are shown in FIGS. 6 and 7. FIG. 6 shows a battery 20 comprising a first battery cell 22a having a first pair of conductors 40a, 40b on a first substrate 24a, a second battery cell 22b having and a second pair of conductors 40c, 40d on a second substrate 24b, and a third battery cell 22c having a third pair of conductors 40e, 40f on a third substrate 24c. Each of the conductors 40a-f comprises an electrode 60a-f and a current collector 72a-f. The electrodes comprise an anode 60a,c,e and a cathode 60b,d,f, and the two current collectors comprising an anode current collector 72*a,c,e* and a cathode current collector 72*b,d,f*. The position and order of the conductors 40*a-f* may be interchanged, for example, the position of the anode 60*a,c,e* and anode current collector 72*a,c,e* may be interchanged with the position of the cathode 60*b,d,f* and cathode current collector 72*b,d,f*. The battery cells 22*a-c* are connected in series with the electrical connectors 130*a-d* which terminate in two terminals 88*a,b*. The electrical connectors 130*a-d* can pass through holes in the substrates 24*a-c* as shown. This version is useful for protecting the current collector and electrical connectors from the environment and to obtain higher voltage.

FIG. 7 also shows three battery cells 22*a-c* connected in parallel with electrical connectors 130*a-d* which extend around the cells 22*a-c* and terminate in two terminals 88*a,b*. In this battery 20, the batteries 22*a-c* is enclosed by a housing 131 comprising two pieces of metal foil 132*a,b* that wrap around the batteries and are joined with adhesive or solder at their center. The joined electrical connectors 130*a-d* pass through the housing 131 to form the terminals 88*a,b*. The housing 131 can serve as shield to prevent electrical or magnetic field from disturbing operation of the battery 20. The housing 131 can also be formed from metalized plastic films, polymer layers, ceramic layers, or metal sheeting. This version is useful in adverse or hostile environments, or where it is desirable for the battery to have improved mechanical strength and to obtain more current and capacity.

Figure 8:
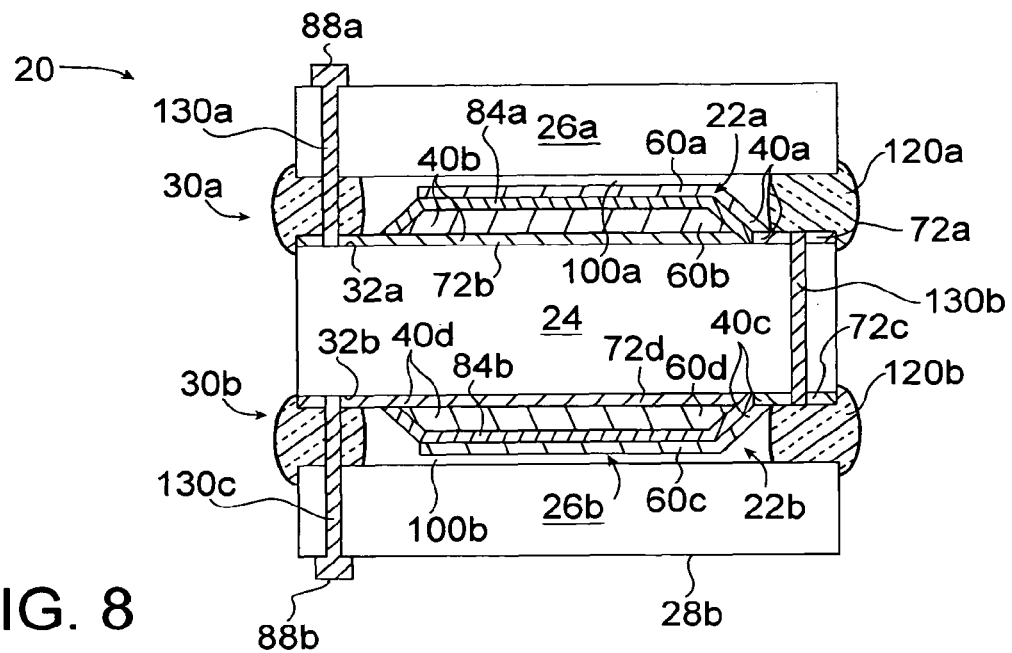
FIG. 8 is a sectional view of a battery comprising battery cells on two opposing surfaces of a single substrate with two caps.

In another version, as shown in FIG. 8, the battery 20 comprises a dual battery cells 22*a,b* which are formed on opposing surfaces 32*a,b* a single substrate 24. For example, a first battery cell 22*a* is formed on a first surface 32*a* of the substrate 24 and the second battery cell 22*b* is formed on the second surface 32*b* of the substrate 24. Each battery cell 22*a,b* comprises an electrolyte 84*a,b* between a pair of conductors 40*a,b* and 40*c,d* respectively. At least one of each pair of conductors 40*a-d* has a non-contact surface 42*a,b* on either side of the substrate 24 that faces a cap 26*a,b*, and is further surrounded along its edges by seals 120*a,b* that encloses the side faces 30*a,b*. The housing enclosure formed by the caps 26*a,b* and the side seals 120*a,b* protects the thin films of the battery 20 from the surrounding ambient environment. Such a battery 20 provides an energy density of more than 700 Watt hr/I and a specific energy of more than 250 Watt hr/kg which is twice as much as a conventional battery that is formed only on a single surface. The battery 20 comprises a first separation gap 100*a* ($d_{g1}$) between the non-contact surface 42*a* of a conductor 40*a* on the substrate 24 and the cap 26*a*, and a second separation gap 100*b* ($d_{g2}$) between the non-contact surface 42*b* of a conductor 40*b* and the cap 26*b*. Each separation gap 100*a,b* has a gap distance $d_{g1,2}$ that is sufficiently large to provide room for expansion of battery components. In one version, the gap distance $d_{g1,2}$ is selected to be from about 1 µm to about 120 µm, and more preferably less than 10 µm. In this battery 20, the battery cells 22*a,b* are connected in series with the electrical connectors 130*a-c*, which terminate at the terminals 88*a,b*.

Figure 9:
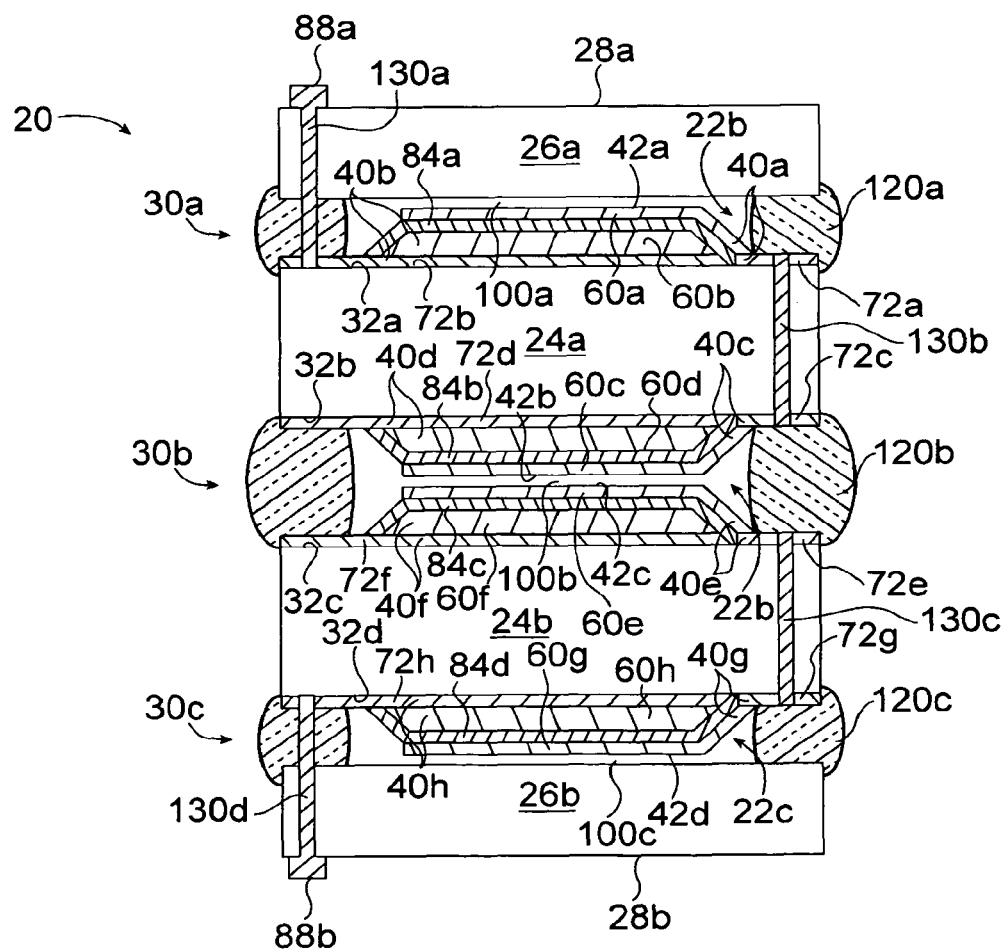
FIG. 9 is a schematic sectional view of a battery comprising an exemplary arrangement of a stack of double sided battery cells connected in series.
Figure 10:
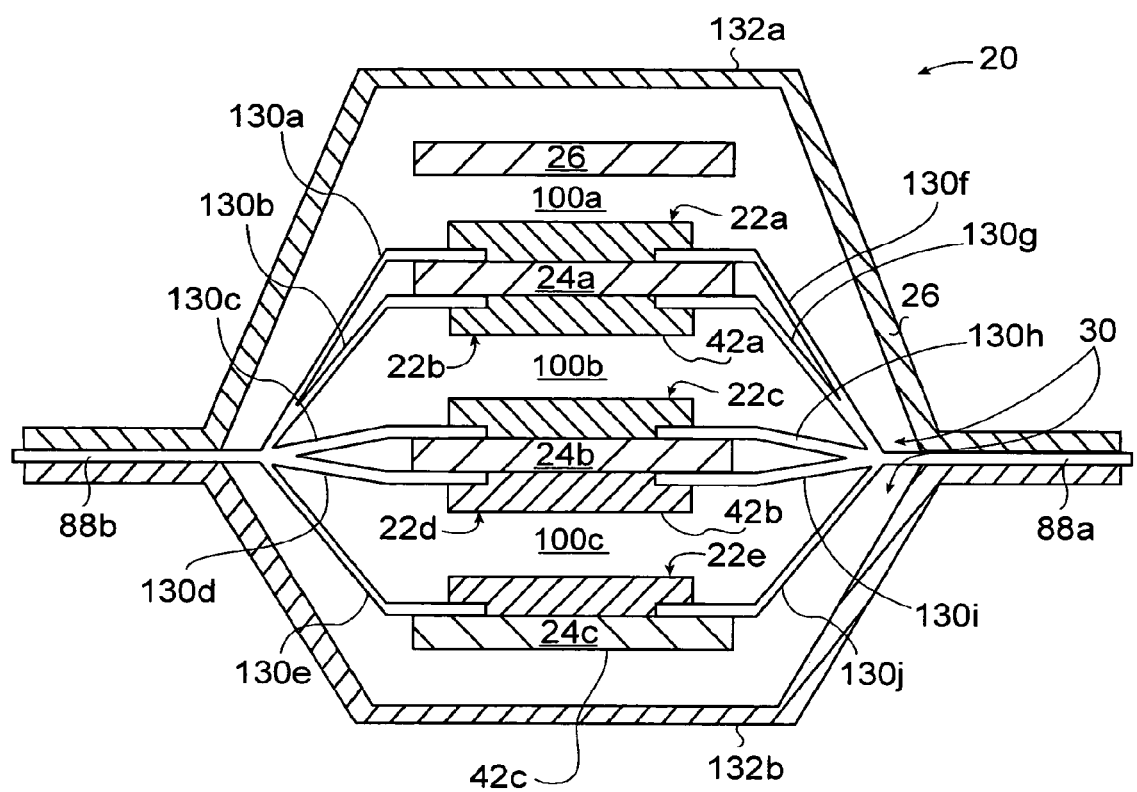
FIG. 10 is a schematic sectional view of a battery comprising an exemplary arrangement of a stack of double sided battery cells connected in a parallel.

FIG. 9 shows a serial arrangement of a battery 20 comprising a stack of substrates 24*a,b* that each have dual battery cells 22*a,b* as shown in FIG. 8. The cells are connected in serial with electrical connectors 130*a-d* which extend through and/or around the cells 22*a-c* to terminate in two terminals 88*a,b*. FIG. 10 shows another version of a battery 20 comprising substrates 20 with multiple cells 22 that are interconnected in a parallel arrangement, which also has electrical connectors 130*a-d* extending around the cells 22*a-c* to terminate in the terminals 88*a,b*. The housing 131 in each of these arrangements can also be formed from metalized plastic films, polymer layers, ceramic layers or metal sheeting. These versions provide high specific energy levels and can be used in adverse environments.

Figure 11A:
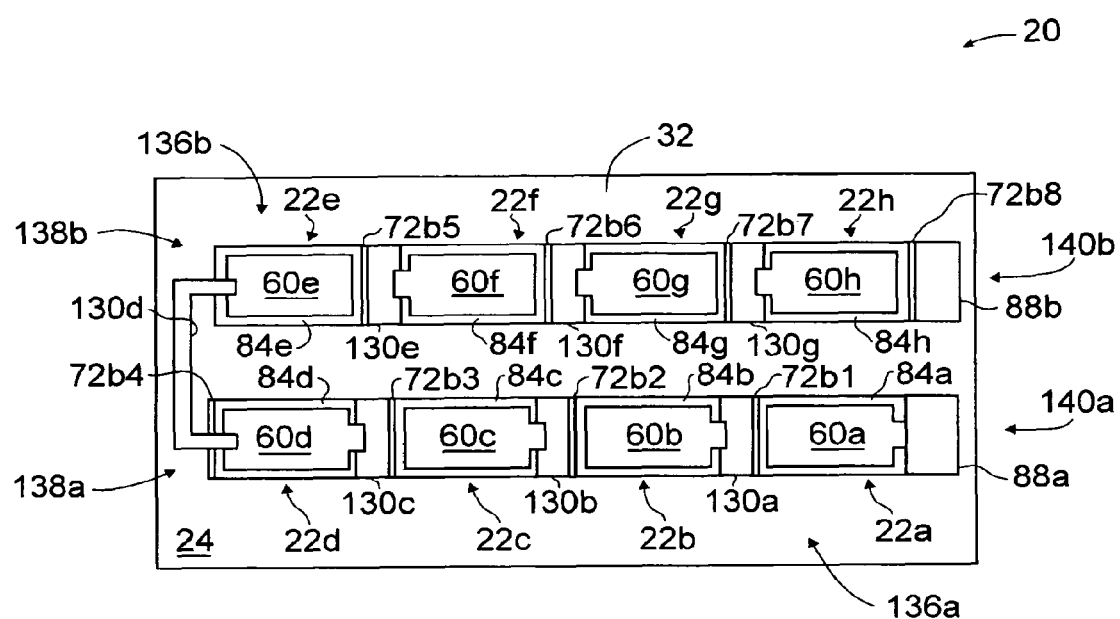
FIG. 11A is a schematic top view of a battery comprising an arrangement of battery cells formed on a single side of a substrate and connected in series.

An embodiment of a battery 20 comprising an arrangement of battery cells 22*a-h* formed on a single surface 32 of a substrate 24 that is a rectangular sheet of mica is illustrated in FIG. 11A. The battery cells 22*a-h* can be interconnected with one another in a series or parallel arrangement. For example, a first battery cell 22*a* is connected in series to a second battery cell 22*b* which is connected in series to a third battery cell 22*c*, and so on. In FIG. 11A, as shown, the anode 60*a-h* of a first cell has a tab that extends out to contact the intervening connector strip 130 which in turn extends over or below an adjacent cathode current collector 72*b*1-8 of the adjacent battery cell. In the version shown in FIG. 11B, a first conductor 40*a*1 of a first battery cell 22*a*, such as an anode 60*a-h*, is connected to a second conductor 40*b*2 of an adjacent second battery cell 22*b*, such as a cathode current collector 72*b*1-8 of the adjacent cell. In each battery cell 22*a-h*, the first and second conductors 40*a*1,*b*1 or 40*a*2,*b*2 are different conductors that are on opposing surfaces of an electrolyte 84*a,b* that is between the conductors. For example, the first conductors 40*a*1,*a*2 can be an anode 60, anode current collector, or a single conducting strip 130*a-g* that serves as both the anode and anode current collector. Conversely, the second conductors 40*b*1,*b*2 can be a cathode 60*b*, cathode current collector 72*b*, or a single conducting strip that serves as both the cathode and cathode current collector. The conducting strip 130 is advantageous when it is desirable to minimize direct contact between the anode 60*a* or anode current collector 72*a* of one cell, and the adjacent cathode 60*b* or cathode current collector 72*b* of another cell, for example, when the anode and cathode materials would react with one another. The connector strip 130 serves as a chemical barrier or buffer strip between the two cells.

Figure 11B:
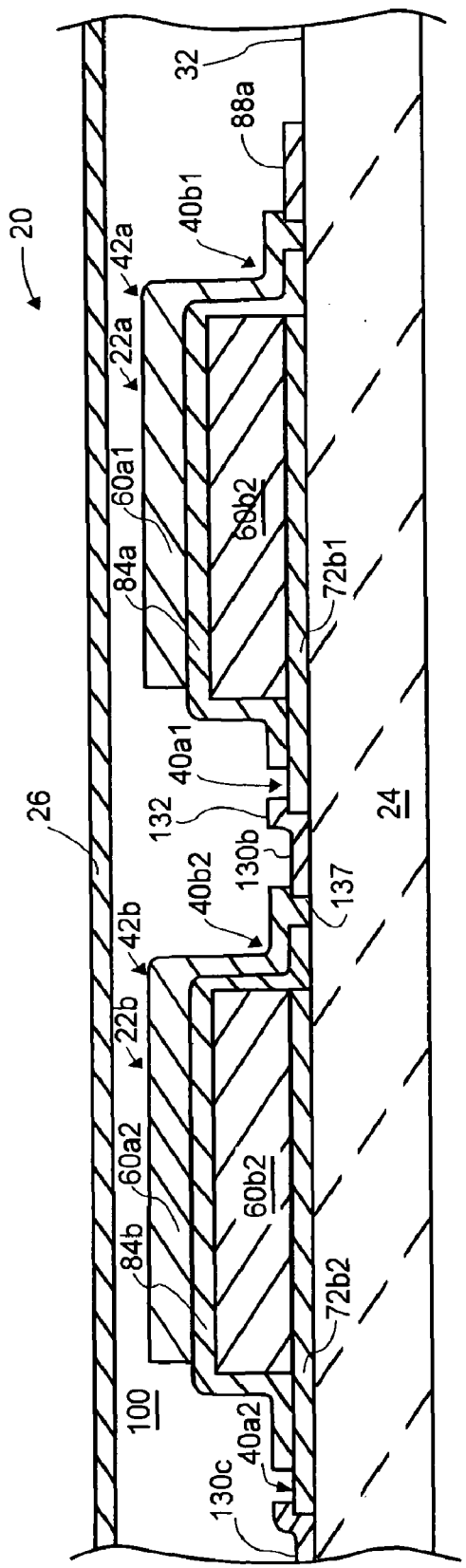
FIG. 11B is a schematic side sectional view of an arrangement of battery cells formed on one side of a substrate and also connected in series.

In one version, as shown in FIG. 11B, the electrical connector strip 130*b* comprises a head 132 that extends over a first conductor 40*a*1 of a battery cell 22*a* and a foot 134 that extends underneath a second conductor 40*b*2 of an adjacent battery cell 22*b*, or vice versa, to electrically couple the battery cells 22*a,b* to one another. For example, the first conductor 40*a*1 can be a cathode current collector 72*b*1 that is below another electrolyte 84*a* and extends out from under the electrolyte, and the second conductor 40*b*2 can be an anode 60*a*2 that overlays the electrolyte 84*b*. In this version, the battery cells 22*a* are arranged in a row with an anode 60*a*1 of a battery cell 22*a* abutting a cathode current collector 72*b*2 of an adjacent battery cell 22*b*, and so on. At least one of the conductor, such as the conductors 40*b*1,*b*2, has a non-contact surface 42*a,b* that does not contact the substrate 24 to allow expansion of the battery cells 22*a,b* in the direction of the non-contact surface. A cap 26 is spaced apart from the non-contact surface 42*a,b* of the conductors 40*b*1,*b*2 by a gap having a gap distance $d_{g1}$ of from about 1 µm to about 120 µm to complete the battery 20.

Referring back to FIG. 11A, the substrate surface 32 can also have more than one row, for example, a first row 136*a* of battery cells 22*a-d* and a second row 136*b* of battery cells 22*e-h* that are electrically connected to one another by an electrical connector strip 130*d* that is a U-shaped strip which connects adjacent battery cells 22*d*, 22*e* at first ends 133*a,b* of the first and second rows 136*a,b*, respectively. The battery cells 22*a* and 22*h* at the second ends 140*a,b* of the first and second rows 136*a,b* of battery cells are terminated with a negative terminal 88*a* and a positive terminal 88*b*, respectively. The negative terminal 88a and positive terminal 88b allow electrical connection of the battery 20 to the external environment.

The thin film components of the battery 20, such as the conductors 40 and electrolyte 84 are deposited on the substrate 24, or onto layers already on the substrate 24, and can have a number of different configurations, for example, positions and shapes, and should not be limited to the exemplary configurations which are described herein to illustrate exemplary embodiments of the invention. These films are typically thin layers that have a thickness of from about 1 μm to about 100 μm; however, they may be thicker of even thinner depending on the desired current carrying capacity of the battery and its desired volume or weight. The thin film layers may be continuous, segmented or patterned. The thin films are typically be deposited by a PVD process, such as RF or DC magnetron sputtering of a target with a relatively high plasma density, for example, as described in U.S. Pat. No. 6,632,563 to Krasnov et al., issued Oct. 14, 2003, which is incorporated herein by reference in its entirety. The deposition chamber may be a vacuum chamber comprising one or more sputtering targets and a process gas distribution manifold for distributing process gases into the chamber.

For example, to deposit a cathode 60 comprising a material such as, for example, a crystalline $LiCoO_2$ film, a mixture of argon and oxygen gases is introduced into the chamber with a total pressure of 5 to 25 mTorr and a volumetric flow rate ratio of $Ar/O_2$ of from about 1 to about 45. The target comprises a disc of $LiCoO_x$. Radio frequency (RF) sputtering of the target can be performed at a power density level of 1 to 20 $W/cm^2$. The $LiCoO_2$ film can be deposited on the substrate at relatively low temperatures, such as less than 100° C. Thereafter, the deposited cathode material is thermally annealed to a temperature of from about 150° C. to 600° C. in an annealing gas comprising ambient oxygen to reduce the defects in the as deposited cathode material.

In another example, to deposit a current collector 72 comprising a metal such as, for example, copper, the current collector is formed by depositing the metal using a sputtering system similar to the one used for deposition of the cathode. However, the sputtering gas may be pure argon and DC instead of RF magnetron sputtering may also be used to sputter a target. To deposit a film comprising copper material, the target material comprises copper and a gas comprising Ar is introduced into the chamber at a pressure of about 1 to 10 mTorr. The gas may be energized with DC energy at a power level of from about 0.5 to about 5 kW, and more preferably about 1 kW. The temperature of the substrate may be maintained at less than 100° C. This is performed for 240 seconds to deposit a film of copper having a thickness of about 0.3 microns on the substrate.

In another example, the deposition of an electrolyte 84 comprising, for example, amorphous lithium phosphorus oxynitride material may be carried out in a vacuum chamber similar to that used for deposition of the cathode and cathode current collector. For example, the lithium phosphorous oxynitride may be deposited by RF sputtering of a lithium phosphate ($Li_3PO_4$) target in pure nitrogen at a power density level of from about 1 to about 20 $W/cm^2$. The flow rate of nitrogen gas is from about 100 to about 1000 sccm, and the gas is maintained at a pressure of less than about 20 mTorr, and more preferably, at least about 1 mTorr. The sample is then annealed in nitrogen or in air at 200° C. for 10 minutes to increase the ionic conductivity of electrolyte and to reduce the resistance of any interfaces.

The above examples of methods to deposit the comprising films are only exemplary embodiments of methods to form the battery 20. Other methods may be used to fabricate the battery 20. Furthermore, the materials of the components described in the exemplary manufacturing methods are only exemplary materials, and components of the battery 20 may comprise other materials as described herein. The scope of the battery 20 should not be limited by the exemplary methods of manufacture provided herein.

While illustrative embodiments of the battery 20 are described in the present application, it should be understood that other embodiments are also possible. For example, the battery 20 may have a plurality of battery cells 22 arranged horizontally or stacked in a convoluted or non-symmetrical shape depending on the application. Also, the packaging assembly of the present invention can be applied to contain and hermetically seal other type of batteries, as would be apparent to those of ordinary skill in the art. Thus, the scope of the claims should not be limited to the illustrative embodiments.

What is claimed is:

1. A battery comprising:
   (a) a substrate comprising a first surface comprising a first battery cell having a first non-contact surface;
   (b) a pliable dielectric abutting the first non-contact surface; and
   (c) a first cap about the pliable dielectric.

2. A battery according to claim 1 wherein the substrate comprises a second surface having a second battery cell with a second non-contact surface, the pliable dielectric abuts the first and second non-contact surfaces, and a second cap is about the pliable dielectric.

3. A battery according to claim 2 wherein the first and second caps each comprise a metal foil, metalized plastic film or metal casing.

4. A battery according to claim 2 wherein the first and second caps each comprise mica, quartz, ceramic casing or glass.

5. A battery according to claim 2 wherein the first and second battery cells each comprise an electrolyte between a pair of conductors, at least one of the conductors comprising the first or second non-contact surfaces, and further comprising a pair of electrical connectors that extend though the pliable dielectric, each electrical connector being connected to at least one conductor of the first or second battery cells.

6. A battery according to claim 1 comprising a plurality of side faces that are not enclosed by the first cap, and wherein the ratio of the area of any one of the first or second non-contact surfaces to the total area of the side faces is at least about 10:1.

7. A battery according to claim 6 wherein the ratio of the area of any one of the first or second non-contact surfaces to the total area of the side faces is from about 20:1 to about 50:1.

8. A battery according to claim 1 wherein the pliable dielectric comprises a thickness of from about 1 μm to about 20 μm.

9. A battery according to claim 8 wherein the pliable dielectric comprises a moisture permeability of less than about 10 g·mil/(100 $in^2$·day).

10. A battery according to claim 1 wherein the pliable dielectric comprises Apiezon®, paraffin, wax, mineral oil or mixtures thereof.

11. A battery comprising:
   (a) a substrate comprising a first surface comprising a first battery cell having a first non-contact surface, and a second surface having a second battery cell with a second non-contact surface,
   (b) a pliable dielectric abutting the first and second non-contact surfaces; and
   (c) first and second caps about the pliable dielectric.

12. A battery according to claim 11 wherein the first and second caps each comprise a metal foil, metalized plastic film or metal casing.

13. A battery according to claim 11 wherein the first and second caps each comprise a sheet of mica, quartz, ceramic casing or glass casing.

14. A battery according to claim 11 wherein the first and second battery cells each comprise an electrolyte between a pair of conductors, at least one of the conductors comprising the first or second non-contact surfaces, and further comprising a pair of electrical connectors that extend though the pliable dielectric, each electrical connector being connected to at least one conductor of the first or second battery cells.

15. A battery according to claim 11 comprising a plurality of side faces that are not enclosed by the first and second caps, and wherein the ratio of the area of any one of the first or second non-contact surfaces to the total area of the side faces is at least about 10:1.

16. A battery according to claim 11 wherein the pliable dielectric comprises a thickness of from about 1 μm to about 20 μm, and a moisture permeability of less than about 10 g·mil/(100 in$^2$·day).

17. A battery according to claim 11 wherein the pliable dielectric comprises Apiezon®, paraffin, wax, mineral oil or mixtures thereof.

18. A battery comprising:
(a) a first substrate comprising opposing surfaces, at least one of the opposing surfaces comprising a battery cell having a non-contact surface abutting a first pliable dielectric, and a pair of first caps about the first pliable dielectric;
(b) a second substrate comprising opposing surfaces, at least one of the opposing surfaces comprising a battery cell having a non-contact surface abutting a second pliable dielectric, and a pair of second caps about the second pliable dielectric;
(c) a seal extending around the side faces of a gap between a first cap and a second cap.

19. A battery according to claim 18 wherein the pairs of first and second caps each comprise a metal foil, metalized plastic film or metal casing.

20. A battery according to claim 18 wherein the pairs of first or second caps each comprise a sheet of mica, quartz, ceramic casing or glass casing.

21. A battery according to claim 18 wherein the seal comprises at least one of:
(1) a moisture permeability of less than about 1.75 g·mil/(100 in$^2$·day); and
(2) epoxy, polymerized ethylene acid copolymer, Apiezon®, paraffin, wax, Surlyn™ or mixtures thereof.

22. A battery according to claim 18 wherein the first and second pliable dielectrics each have a thickness of from about 1 μm to about 20 μm, and a moisture permeability of less than about 10 g·mil/(100 in$^2$·day).

23. A battery according to claim 18 wherein the first and second pliable dielectrics each comprise Apiezon®, paraffin, wax, mineral oil or mixtures thereof.

24. A battery comprising:
(a) a first substrate comprising opposing surfaces having a first hole therethrough, the first hole having an edge;
(b) at least one first battery cell on an opposing surface of the first substrate, the first battery cell comprising an electrolyte between a pair of conductors, the conductors comprising a first terminal contacting the edge of the first hole;
(c) a second substrate comprising opposing surfaces, at least one of the opposing surfaces comprising a second battery cell comprising an electrolyte between a pair of conductors, the conductors comprising a second terminal; and
(d) an electrical conductor extending through the first hole to contact a second terminal, thereby electrically connecting a first terminal to a second terminal.

25. A battery according to claim 24 comprising a seal extending around the side faces of a gap between the first substrate and the second substrate.

26. A battery according to claim 25 wherein the seal comprises at least one of:
(1) a moisture permeability of less than about 1.75 g·mil/(100 in$^2$·day);
(2) a thickness of from about 1 μm to about 20 μm; and
(3) epoxy, polymerized ethylene acid copolymer, Apiezon®, paraffin, wax, Surlyn™ or mixtures thereof.

27. A battery comprising:
(a) a first substrate comprising opposing first and second surfaces and having a first hole extending from the first surface to the second surface, the first hole having an edge;
(b) a first battery cell on the first surface of the first substrate, the first battery cell comprising an electrolyte between a pair of conductors, the conductors comprising a first terminal contacting an edge of the first hole;
(c) a second battery cell on the second surface of the first substrate, the second battery cell comprising an electrolyte between a pair of conductors, the conductors comprising a second terminal contacting an edge of the first hole; and
(d) a first electrical conductor extending through the first hole to electrically connect the first terminal to the second terminal.

28. A battery according to claim 27 further comprising:
(e) a second substrate comprising opposing third and fourth surfaces and having a second hole extending from the third surface to the fourth surface, the second hole having an edge;
(f) a third battery cell on the third surface of the second substrate, the third battery cell comprising an electrolyte between a pair of conductors, the conductors comprising a third terminal contacting an edge of the second hole;
(g) a fourth battery cell on the fourth surface of the second substrate, the fourth battery cell comprising an electrolyte between a pair of conductors, the conductors comprising a fourth terminal contacting an edge of the second hole; and
(h) a second electrical conductor extending through the second hole to electrically connect the third terminal to the fourth terminal.

29. A battery according to claim 27 comprising at least one of:
(1) a first pliable dielectric abutting a conductor of the first battery cell; and
(2) a second pliable dielectric abutting a conductor of the second battery cell.

30. A battery according to claim 29 wherein at least one of the first and second pliable dielectrics comprises a thickness of from about 1 μm to about 20 μm.

31. A battery according to claim 27 comprising at least one of:
(1) a first cap and a first seal extending around the side faces of a gap between the first cap and the first surface of the first substrate; and
(2) a second cap and a second seal extending around the side faces of a gap between the second cap and the second surface of the first substrate.

32. A battery according to claim 31 wherein at least one of the first and secod seals comprises a thickness of from about 1 μm to about 20 μm.

33. A battery comprising:
(a) a first substrate comprising opposing surfaces, the opposing surfaces having a first hole therethrough, the first hole having an edge;
(b) at least one first battery cell on an opposing surface of the first substrate, the first battery cell comprising an electrolyte between a pair of conductors, the conductors comprising a non-contact surface abutting a pliable dielectric and a first terminal contacting an edge of the first hole;
(c) a second substrate comprising opposing surfaces, at least one of the opposing surfaces comprising a second battery cell comprising an electrolyte between a pair of conductors, the conductors comprising a second terminal and a non-contact surface abutting a pliable dielectric; and
(d) a first electrical conductor extending through the first hole and a pliable dielectric to contact a second terminal, thereby electrically connecting a first terminal to a second terminal.

34. A battery according to claim 33 wherein the opposing surfaces of the second substrate comprise a second hole therethrough, the second hole having an edge that contacts the second terminal.

35. A battery according to claim 34 further comprising:
(e) a third substrate comprising opposing surfaces, at least one of the opposing surfaces comprising a third battery cell comprising an electrolyte between a pair of conductors, the conductors comprising a third terminal and a non-contact surface abutting a pliable dielectric; and
(f) a second electrical conductor extending through the second hole and a pliable dielectric to contact a third terminal, thereby electrically connecting a second terminal to a third terminal.

36. A battery according to claim 33 comprising first and second caps.

37. A battery according to claim 35 comprising first and second caps.

38. A battery comprising:
(a) a substrate comprising opposing first and second surfaces and having a hole extending from the first surface to the second surface, the hole having an edge;
(b) a first battery cell on the first surface of the substrate, the first battery cell comprising an electrolyte between a pair of conductors, the conductors comprising a first terminal contacting an edge of the hole and a first non-contact surface abutting a pliable dielectric;
(c) a second battery cell on the second surface of the substrate, the second battery cell comprising an electrolyte between a pair of conductors, the conductors comprising a second terminal contacting an edge of the hole and a second non-contact surface abutting a pliable dielectric;
(d) an electrical conductor extending through the hole to electrically connect the first terminal to the second terminal; and
(e) first and second caps.

\* \* \* \* \*